US010283762B2

(12) United States Patent
Hong et al.

(10) Patent No.: US 10,283,762 B2
(45) Date of Patent: May 7, 2019

(54) ANODE ACTIVE MATERIAL FOR LITHIUM SECONDARY BATTERY, METHOD FOR PREPARING THE SAME AND LITHIUM SECONDARY BATTERY COMPRISING THE SAME

(75) Inventors: Ji-Jun Hong, Seoul (KR); Sung-Tae Ko, Chungcheongnam-do (KR); Yoon-Jeong Heo, Chungcheongnam-do (KR)

(73) Assignee: Kokam Co., Ltd., Siheung, Gyeonggi-do (KR)

( * ) Notice: Subject to any disclaimer, the term of this patent is extended or adjusted under 35 U.S.C. 154(b) by 2291 days.

(21) Appl. No.: 12/528,064

(22) PCT Filed: May 26, 2009

(86) PCT No.: PCT/KR2009/002776
§ 371 (c)(1),
(2), (4) Date: Jan. 27, 2012

(87) PCT Pub. No.: WO2010/137753
PCT Pub. Date: Dec. 2, 2010

(65) Prior Publication Data
US 2019/0088936 A1    Mar. 21, 2019

(51) Int. Cl.
*H01M 4/485* (2010.01)
*H01M 4/587* (2010.01)
*H01M 4/36* (2006.01)
*H01M 4/62* (2006.01)
*H01M 10/0525* (2010.01)
*H01M 4/02* (2006.01)

(52) U.S. Cl.
CPC .......... *H01M 4/366* (2013.01); *H01M 4/485* (2013.01); *H01M 4/587* (2013.01); *H01M 4/622* (2013.01); *H01M 4/625* (2013.01); *H01M 10/0525* (2013.01); *H01M 2004/027* (2013.01)

(58) Field of Classification Search
None
See application file for complete search history.

(56) References Cited

FOREIGN PATENT DOCUMENTS

| JP | 2001-243950 A | 9/2001 |
|----|---------------|--------|
| JP | 2006-066298 A | 3/2006 |

(Continued)

*Primary Examiner* — Jonathan Crepeau
(74) *Attorney, Agent, or Firm* — Mintz Levin Cohn Ferris Glovsky and Popeo, P.C.; Kongsik Kim

(57) ABSTRACT

Provided are an anode active material for a lithium secondary battery, a method of preparing the same and a lithium secondary battery comprising the same. The anode active material for a lithium secondary battery includes a carbonaceous material core; and a shell formed outside of the carbonaceous material core. The shell includes a plurality of spinel-type lithium titanium oxide particles, and a plurality of metal oxide particles, wherein the metal belongs to group 4 or 13 of the periodic table, the metal oxide particles filling voids formed by the carbonaceous material and the plurality of spinel-type lithium titanium oxide particles. The anode active material for a lithium secondary battery has the metal oxide shell, and thus has the improved conductivity, a high output density, and consequently excellent electrical characteristics. The lithium secondary battery manufactured using the anode active material ensures safety sufficiently.

14 Claims, 8 Drawing Sheets (a)

(b)

(56) References Cited

FOREIGN PATENT DOCUMENTS

| | | | |
|---|---|---|---|
| JP | 2009-252421 | * | 10/2009 |
| KR | 10-2003-0062541 | | 7/2003 |
| KR | 10-2006-0047424 | | 5/2006 |
| KR | 10-2006-0106761 | | 10/2006 |
| KR | 10-2007-0078536 | | 8/2007 |
| WO | WO 2009/002053 | * | 12/2008 |
| WO | WO-2009-061013 A1 | | 5/2009 |
| WO | 2010-064755 A1 | | 6/2010 |

* cited by examiner

[Figure 1]
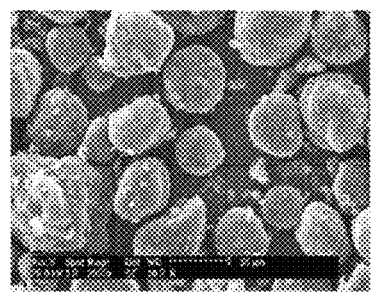
(a)
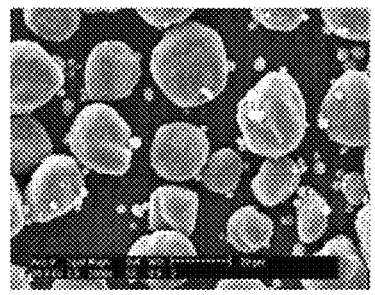
(b)

[Figure 2]
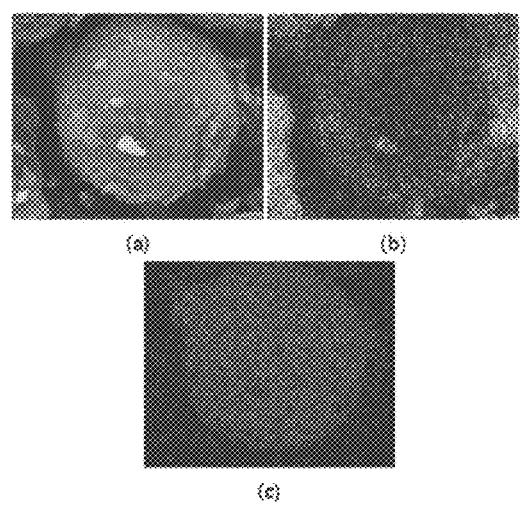

[Figure 3]
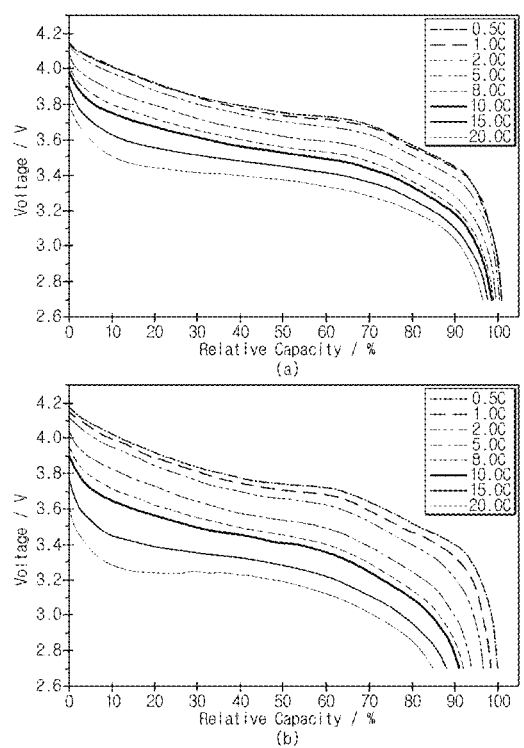

[Figure 4]
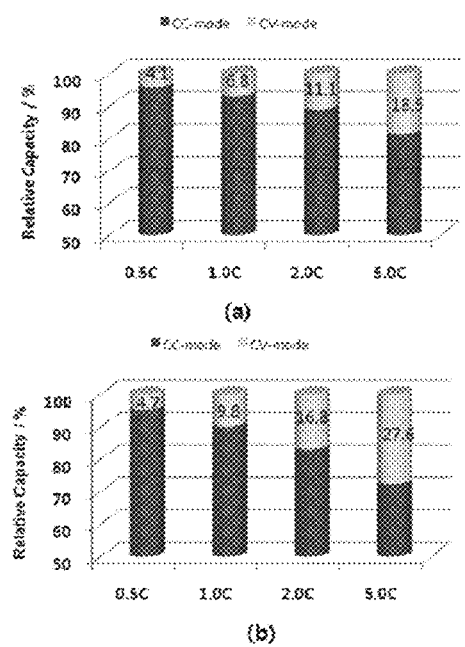

[Figure 5]
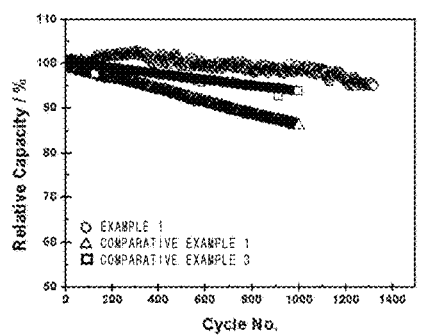

[Figure 6]
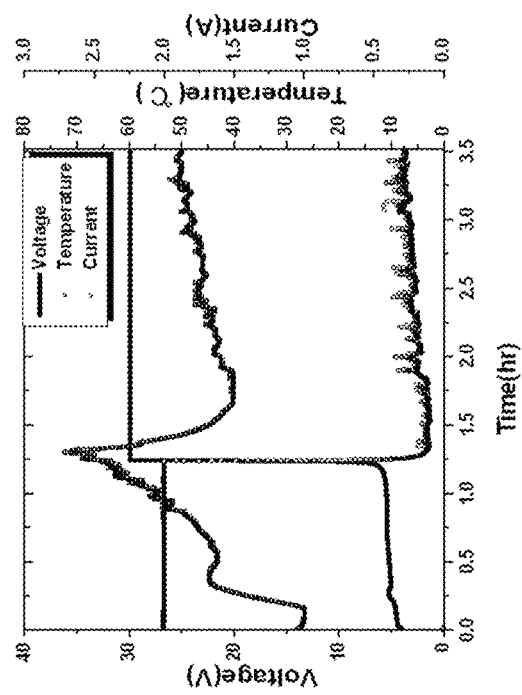

[Figure 7]
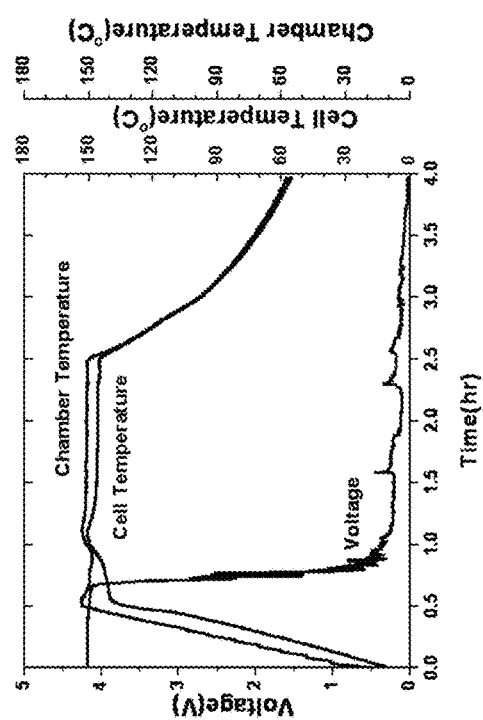

[Figure 8]
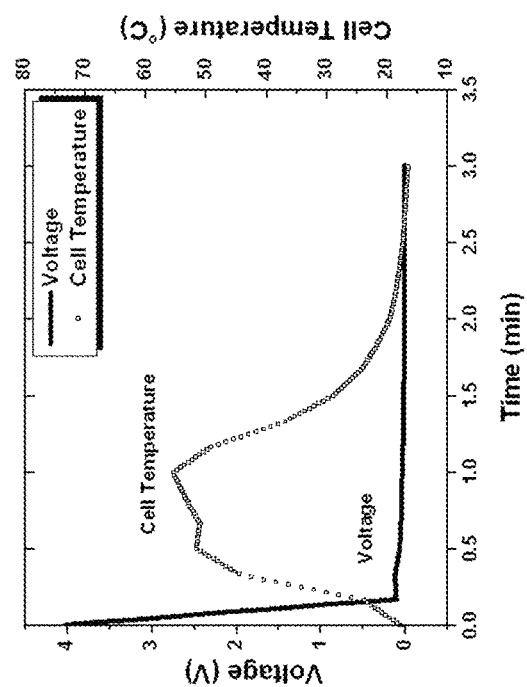

ANODE ACTIVE MATERIAL FOR LITHIUM SECONDARY BATTERY, METHOD FOR PREPARING THE SAME AND LITHIUM SECONDARY BATTERY COMPRISING THE SAME

CROSS-REFERENCES TO RELATED APPLICATIONS

This application is a U.S. national phase application, pursuant to 35 U.S.C. § 371, of PCT/KR2009/002776, filed May 26, 2009, designating the United States. The entire contents of the aforementioned patent applications are incorporated herein by this reference.

TECHNICAL FIELD

The present invention relates to an anode active material for a lithium secondary battery, a method for preparing the same, and a lithium secondary battery comprising the same. More particularly, the present invention relates to an anode active material that can improve electrical characteristics and safety of a lithium ion secondary battery or lithium ion polymer battery, and a method for preparing the same.

BACKGROUND ART

With rapid development of electronics, communications and computer industries, portable electronic communication equipments such as camcorders, mobile phones or notebook computers develop remarkably. Accordingly, the demand for a lithium secondary battery as a power source for driving the portable electronic communication equipments is increasing day by day. In particular, in application of electric vehicles, uninterruptible power supplies, motor tools or artificial satellites, research and development of the lithium secondary battery as an environmentally friendly power source is lively made inside and outside of the country including Japan, Europe and U.S.A.

Currently, an anode active material for a lithium secondary battery includes crystalline carbon such as natural graphite or artificial graphite, and amorphous carbon such as non-graphitizable carbon or graphitizable carbon.

The natural graphite has advantages of low price, a flat discharge curve at a negative potential and excellent initial discharge capacity. However, charge/discharge efficiency and charge/discharge capacity reduce remarkably while charge and discharge cycles are repeated.

Mesophase graphite has a spherical particle shape and allows high density filling, and thus is capable of improving an energy density per volume of a battery and exhibits excellence in forming an electrode plate. However, the mesophase graphite has a disadvantage of a low reversible capacity.

The non-graphitizable carbon has advantages of excellent safety and high capacity. However, the non-graphitizable carbon has smaller size than graphitizable carbon, and has a micropore, consequently low density, thus causing irregular particle shape and particle size after a pulverizing process. By these reasons, the non-graphitizable carbon is difficult to be widely applied to a battery.

And, to meet the demand for safety and high capacity, a recent attention is given to a lithium titanium oxide. The lithium titanium oxide has a spinel-type stable structure, and thus is evaluated as one of materials capable of improving safety. The use of the lithium titanium oxide as an anode active material allows flatness of a potential curve, excellent charge and discharge cycle life, improved high rate characteristics and power characteristics, and excellent durability. However, in the case that lithium titanium oxide is used singularly, battery characteristics are reduced due to a low average voltage.

Therefore, various methods have been suggested to solve the problems of the conventional anode active material. So far, however, there is no report of such an anode active material evaluated as it improves electrical characteristics and safety of a lithium secondary battery.

For example, Korean Patent Registration No. 10-0666822 discloses a method for surface-coating carbon with a metal or metalloid for high capacity and high efficiency of a battery.

Korean Patent Registration No. 10-0433822 discloses a method for surface-coating a carbon active material with a metal or metal oxide to improve conductivity, high rate charge and discharge characteristics and cycle life.

Korean Laid-open Patent Publication No. 10-2007-0078536 discloses a method for coating natural graphite with a low crystallinity carbon material.

Korean Laid-open Patent Publication No. 10-2006-0106761 discloses a method for adding graphite or carbon black to lithium titanium oxide so as to prevent overcharge.

However, the methods suggested in the above-mentioned prior arts are evaluated as not sufficiently exhibiting effects of maintaining electrical characteristics well and improving safety of a lithium secondary battery.

Therefore, it requires to suggest an anode active material capable of maintaining excellent battery characteristics and exhibiting excellent safety and a method for preparing the anode active material with excellent reproducibility and productivity.

DISCLOSURE

Technical Problem

An object of the present invention is to provide an anode active material for a lithium secondary battery that can improve basic electrochemical characteristics and safety of the lithium secondary battery, and a method for preparing the anode active material with excellent reproducibility and productivity.

Technical Solution

To solve the above-mentioned problems, an anode active material for a lithium secondary battery according to the present invention includes a carbonaceous material core; and a shell formed outside of the carbonaceous material core. The shell includes a plurality of spinel-type lithium titanium oxide particles attached on an outer surface of the carbonaceous material core, and a plurality of metal oxide particles, wherein the metal belongs to group 4 or 13 of the periodic table, the metal oxide particles filling voids formed by the carbonaceous material and the plurality of spinel-type lithium titanium oxide particles. The anode active material for a lithium secondary battery according to the present invention has the shell including the lithium titanium oxide and the metal oxide that have different average particle sizes. Thus, conductivity and high output density are improved, resulting in excellent electrical characteristics. And, a lithium secondary battery using the anode active material according to the present invention can ensure sufficient safety.

And, a method for preparing an anode active material for a lithium secondary battery according to the present invention includes (S1) preparing a core forming carbonaceous material; and (S2) forming a shell outside of the core by dry-coating the core with a mixture of a plurality of spinel-type lithium titanium oxide particles and a plurality of metal oxide particles, wherein the metal belongs to group 4 or 13 of the periodic table, the metal oxide particles having such an average particle size to be located in voids formed by the carbonaceous material and the lithium titanium oxide particles.

Optionally, the method for preparing an anode active material according to the present invention may further include adding thermoplastic polymer powder and/or a conductive material as a shell forming material, in the step (S2). Optionally, the method may further include thermally treating the resulting product after the step (S2).

The above-mentioned anode active material can be used to manufacture an anode of a lithium secondary battery and a lithium secondary battery including the anode.

DESCRIPTION OF DRAWINGS

These and other features, aspects, and advantages of preferred embodiments of the present invention will be more fully described in the following detailed description, taken accompanying drawings. In the drawings:

FIG. 1 shows SEM (Scanning Electron Microscope) images of an anode active material (FIG. 1a) prepared in Example 1 and an anode active material (FIG. 1b) prepared in Comparative example 3.

FIG. 2 shows cross-sectional and mapping SEM images of particles of the core-shell anode active material prepared in Example 1 (FIG. 2a: mapping image, FIG. 2b: Ti mapping image, FIG. 2c: C mapping image).

FIG. 3 is a graph illustrating discharge characteristics with current density of a lithium secondary battery (FIG. 3a) using the anode active material prepared in Example 1 and a lithium secondary battery (FIG. 3b) using an anode active material prepared in Comparative example 1.

FIG. 4 is a graph illustrating charge characteristics with current density of the lithium secondary battery (FIG. 4a) using the anode active material prepared in Example 1 and the lithium secondary battery (FIG. 4b) using the anode active material prepared in Comparative example 1.

FIG. 5 is a graph illustrating cycle characteristics at room temperature of lithium secondary batteries using each anode active material prepared in Example 1, Comparative example 1, and Comparative example 3.

FIG. 6 is a graph illustrating battery behavior and change in surface temperature after a 30V overcharge test of the lithium secondary battery using the anode active material prepared in Example 1.

FIG. 7 is a graph illustrating battery behavior after high temperature storage of the lithium secondary battery using the anode active material prepared in Example 1.

FIG. 8 is a graph illustrating battery behavior and change in surface temperature after a nail penetration test of the lithium secondary battery using the anode active material prepared in Example 1.

Mode for Invention

Hereinafter, an anode active material for a lithium secondary battery of the present invention will be described in detail according to its preparation method. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

First, a core forming carbonaceous material is prepared (S1).

The carbonaceous material useful in the present invention is not limited to a specific material if it is a carbonaceous material used as an anode active material for a lithium secondary battery in the prior art. For example, the carbonaceous material includes low crystallinity carbon and high crystallinity carbon. Typically, the low crystallinity carbon includes soft carbon and hard carbon, and the high crystallinity carbon includes high temperature plasticity carbon such as natural graphite, Kish graphite, pyrolytic carbon, mesophase pitch based carbon fiber, meso-carbon microbeads, mesophase pitches, or petroleum or coal tar pitch derived cokes.

The core carbonaceous material may have an average particle size of a conventional anode active material. For example, the average particle size may be 3 to 60 $\mu m$, however the present invention is not limited in this regard.

Next, the core is dry-coated with a mixture of a plurality of spinel-type lithium titanium oxide particles and a plurality of metal oxide particles, wherein the metal belongs to group 4 or 13 of the periodic table, the metal oxide particles having such an average particle size to be located in voids created by the carbonaceous material and the lithium titanium oxide particles, to form a shell outside of the core (S2).

The anode active material of the present invention can improve the battery performance by forming a shell consisted of specific compound particles outside of a carbonaceous material core. For example, in the case of natural graphite, charge/discharge efficiency and charge/discharge capacity reduce remarkably while charge and discharge cycles are repeated, which is resulted from a decomposition reaction of a liquid electrolyte occurring at an edge of the natural graphite of high crystallinity. And, in the case that the natural graphite is coated with a shell according to the present invention, the reaction between the edge and the liquid electrolyte is prevented, and consequently the above-mentioned problems can be solved. And, in the case of low crystallinity carbon, effects of suppressing reactivity with an electrolyte and sensitivity to moisture increase by surface-coating according to the present invention, thereby improving the battery performance.

The shell of the present invention is described in detail as follows.

In the anode active material of the present invention, charging proceeds earlier, at around 1.0 to 1.5V based on a lithium metal, to the spinel-type lithium titanium oxide ($Li_4Ti_5O_{12}$) of the shell than the carbonaceous material of the core, so that a passivating layer or solid electrolyte interface (SEI) layer having good ion conductivity in the above-mentioned range is formed on the surface of an anode. And, the activated lithium titanium oxide reduces resistance of the surface of the anode. As a result, the anode active material of the present invention can have excellent electrical characteristics.

And, the above-mentioned layer suppresses a reaction between the carbonaceous material corresponding to the core and a non-aqueous liquid electrolyte, and thus it can prevent phenomenon that the non-aqueous liquid electrolyte is decomposed or a structure of the anode is destroyed. And, the lithium titanium oxide of the shell and the layer surrounding the carbonaceous material core restrict a contact between the core and the liquid electrolyte. Accordingly, eduction of lithium on the surface of the anode active material is suppressed to reduce an amount of heat involved in the reaction with the liquid electrolyte. Therefore, the anode active material of the present invention can provide excellent battery performance and safety.

A content of the spinel-type lithium titanium oxide for the shell may be properly selected depending on purpose of use, kind or a manufacturing environment of a lithium secondary battery. For example, a weight ratio of the carbonaceous material core to the spinel-type lithium titanium oxide shell can be adjusted such that the carbonaceous material: the spinel-type lithium titanium oxide=1:0.0055~0.05. The above-mentioned range can provide an intentional effect of the present invention because a redundant lithium titanium oxide does not leave behind and the entire surface of the carbonaceous material is sufficiently coated.

An average particle size of the spinel-type lithium titanium oxide for the shell may vary depending on purpose of use or a manufacturing environment, for example 30 to 800 nm. The above-mentioned range is preferable because agglomeration of particles is minimized and a coating process is performed effectively.

In addition to the spinel-type lithium titanium oxide, the shell of the anode active material according to the present invention includes metal oxide particles, wherein the metal belongs to group 4 or 13 of the periodic table.

In the present invention, the metal oxide particles, wherein the metal belongs to group 4 or 13 of the periodic table, have higher hardness than the core carbonaceous material. Thus, the carbonaceous material can obtain sphericity and disintegration effects during a dry coating process, due to friction with the metal oxide particles. And, the resulting fine cracks or scratches on the surface of the carbonaceous material by the metal oxide particles during the dry coating process allows easy attachment of the lithium titanium oxide particles and conductive material particles (to be described later) that may be optionally included in the shell, to the surface of the carbonaceous material, thereby maximizing a coating performance.

And, the metal oxide particles have such a small average particle size that the metal oxide particles can be located in voids created by the core carbonaceous material and the lithium titanium oxide particles (optionally including conductive material particles), and thus the metal oxide particles fill the voids created by the core carbonaceous material and the spinel-type lithium titanium oxide particles, so that bond between the above-mentioned particles comprising the shell can be improved. Preferably, the average particle size of the metal oxide particles, wherein the metal belongs to group 4 or 13 of the periodic table, is several nanometers to tens nanometers. For example, the average particle size of the metal oxide may be 5 to 30% of the average particle size of the spinel-type lithium titanium oxide, however the present invention is not limited in this regard. In the case that the average particle size of the metal oxide is in the above-mentioned range, the coating performance of the spinel-type lithium titanium oxide, and sphericity and disintegration effects of the carbonaceous material and the lithium titanium oxide can exhibit effectively.

It is obvious to an ordinary person skilled in the art that the extent to which the metal oxide particles fill the voids varies in the same shell. And, some of the metal oxide particles may be located in the voids and the others may be located between the lithium titanium oxide particles and the core carbonaceous material or between the lithium titanium oxide particles, which is obvious to an ordinary person skilled in the art without departing from the scope of the invention.

As the metal oxide particles, wherein the metal belongs to group 4 or 13 of the periodic table, the present invention may preferably use titanium dioxide, aluminum oxide, zirconium oxide, hafnium oxide or tallium oxide, and more preferably titanium dioxide.

And, a content of the metal oxide particles, wherein the metal belongs to group 4 or 13 of the periodic table, may be 2 to 10 parts by weight based on 100 parts by weight of the lithium titanium oxide, however the present invention is not limited in this regard. In the case that the content is less than 2 parts by weight, coating of the spinel-type lithium titanium oxide on the surface of the core carbonaceous material is ineffectectual. In the case that the content is more than 10 parts by weight, titanium dioxide left over after coating may increase resistance between active materials to deteriorate electrochemical characteristics.

In the present invention, the shell may optionally further include a conductive material. The conductive material used in the present invention increases conductivity of the anode active material of the present invention. Preferably, the conductive material useful in the present invention includes at least one of the group consisting of super-P, Ketjen black, graphite, acetylene black, carbon nano tube and activated carbon.

Preferably, the conductive material has similar average particle size to the spinel-type lithium titanium oxide, for example 800 nm or less. As the average particle size is smaller than 800 nm, the specific surface area of the conductive material increases, resulting in reduction in an amount of addition and increase in coating effect. And, a minimum limit of the average particle size of the conductive material is not limited to a specific value. For the convenience of handling, it is possible to use a conductive material having an average particle size of, for example, about 1 nm or more, however the present invention is not limited in this regard. In the case that the average particle size is larger than 800 nm, it is not preferable because the conductive material has difficulty in forming a shell with the other materials used to form the shell.

A content of the conductive material used in the shell may be properly selected according to purpose of use, kind or a manufacturing environment of a lithium secondary battery. For example, the content of the conductive material may be 0.1 parts by weight or more, based on 100 parts by weight of the carbonaceous material, however the present invention is not limited in this regard. In the case that the content of the conductive material is less than 0.1 parts by weight, a usage effect of the conductive material is insufficient. And, in the case that the conductive material is used in a relatively excessive amount, a conductive material left over after coating exits on the surface of the anode active material or is mixed with the anode active material. As a result, it does not require an additional conductive material when preparing a slurry, thereby reducing the time spent in preparing the slurry. By this reason, a maximum limit of the content of the conductive material for the shell is not limited to a specific value. However, for improvement of conductivity and coating performance, the conductive material may be included in an amount of 0.5 parts by weight or less, however the present invention is not limited in this regard.

The spinel-type lithium titanium oxide is coated on the carbonaceous material core by a dry coating process. The dry coating process coats the surface of the core with coating materials for the shell in a mechanical manner. A shear force, a collision force or a compression force is applied according to necessity, thereby varying from simple mixing to coating. In particular, in the present invention, sphericity and disintegration occur to the carbonaceous material corresponding to the core by the nano metal oxide corresponding to the shell at the same time, thereby improving powder characteristics of the anode active material.

In the present invention, the shell may optionally further include thermoplastic polymer powder. The thermoplastic polymer powder has an increased flowability when its temperature exceeds the glass transition temperature, the softening point or the melting point temperature due to friction heat generated during the dry coating process. At this time, the thermoplastic polymer powder acts as a binder, and accordingly, coating performance can be improved.

After coating of the shell is completed, thermal treatment may be performed. The thermal treatment may increase adhesion between the carbonaceous material and the lithium titanium oxide, and remove impurities.

The thermal treatment conditions may be properly selected depending on the kind or a preparation environment of the core carbonaceous material. For example, the thermal treatment may be performed at 100 to 450° C. for 2 to 12 hours, however the present invention is not limited in this regard. The thermal treatment conditions may be adjusted according to necessity. For example, to simply remove moisture, the thermal treatment may be performed at a relatively lower temperature for a longer time within the above-mentioned range. To remove impurities, the thermal treatment may be performed at a relatively higher temperature for a shorter time. The thermal treatment can increase the density of the shell, sufficiently solve defects in a crystal structure of the core, and stably maintain a structure of the core. When the thermal treatment is performed within the above-mentioned time range, effects of the thermal treatment are sufficiently obtained. In the case that the thermal treatment is performed more than 12 hours, an additional effect of the increased time is not expected.

Through the above-mentioned method, an anode active material of the present invention can be obtained, and an anode of a lithium secondary battery and a lithium secondary battery can be manufactured using the same. In the manufacture of the anode of a lithium secondary battery and the lithium secondary battery using the anode active material of the present invention, methods used in the prior art can be applied without limitation.

An exemplary method for manufacturing a lithium secondary battery is described as follows.

First, an electrode active material composition including an electrode active material, a binder, a solvent and optionally a conductive material is coated on a current collector to form an electrode active material layer. At this time, the electrode active material layer is formed by directly coating the electrode active material composition on a current collector, or by coating the electrode active material composition on a separate support, drying the composition, separating the resulting film from the support and laminating the film onto a current collector. Here, the support is not limited to a specific one if it is capable of supporting the electrode active material layer, for example a Mylar film or a polyethyleneterephthalate (PET) film.

The electrode active material, the binder, the conductive material and the solvent may be all typical ones used to manufacture a lithium secondary battery in the prior art. For example, a cathod active material may be a lithium-containing metal oxide such as $LiCoO_2$, $LiNiO_2$ and $LiMn_2O_4$ or a lithium-containing metal oxide obtained by adding Co, Ni or Mn to the above-mentioned lithium-containing metal oxide, such as $LiNi_{1-x}Co_xO_2$, and may be sulfide, selenide or halide other than the above-mentioned oxides.

The binder may be polyvinylidenefluoride-hexafluoropropylene copolymer (PVDF-co-HFP), polyvinylidenefluoride, polyacrylonitrile, polymethylmethacrylate, or mixtures thereof. Typically, the conductive material may be carbon black or acetylene black, and the solvent may be acetone or N-methylpyrrolidone.

After an electrode is formed as mentioned above, a separator is interposed between a cathode electrode plate and an anode electrode plate. An electrode assembly is manufactured in this way. Subsequently, the manufactured electrode assembly is put into a case and a liquid electrolyte for a lithium secondary battery is added, so that a lithium secondary battery of the present invention is completed.

Hereinafter, the preferred embodiments of the present invention are described in detail with reference to the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

Example 1

Preparation of Core-Shell Type Anode Active Material

Mesophase Graphite Powder (MGP; China Steel Chemical Corporation) was used as a core forming carbonaceous material. A spinel-type lithium titanium oxide having a particle size distribution of 30 to 500 nm, Super-P having an average particle size of 500 nm and $TiO_2$ having an average particle size of 40 nm were used as shell forming materials. 1,000 g of the prepared MGP was mixed with 20 g of the lithium titanium oxide, 5 g of the Super-P and 1 g of the $TiO_2$. The mixture was treated for 3 minutes in a dry coating system (Hosokawa Micron Corp., Japan, NOB-130) with a speed of rotation of 2500 rpm to prepare a core-shell type anode active material.

<Manufacture of Anode and Lithium Secondary Battery>

The prepared anode active material, a conductive carbon for providing conductivity, and PVdF (polyvinylidenefluoride) as a binder were mixed with a mixing ratio of 85/8/7, and a proper amount of NMP (N-methylpyrrolidone) was added to obtain a slurry having a proper viscosity. The slurry was coated on a copper foil, dried and compressed to obtain an anode of a lithium secondary battery.

A lithium metal oxide composite, $LiNi_{(1-x-y)}Mn_xCo_yO_2$ was used as a cathode, a separator was interposed between the above-mentioned anode and cathode, and an aluminum outer member was applied to manufacture a lithium secondary battery. The battery had a size of 4.5 mm thickness×64 mm width×95 mm length, and a design capacity of 2000 mAh.

Example 2

An anode active material, an electrode and a lithium secondary battery were manufactured by the same method as those of the Example 1, except that 15 g of lithium titanium oxide, 3 g of Super-P and 1 g of $TiO_2$ were used.

Example 3

An anode active material, an electrode and a lithium secondary battery were manufactured by the same method as those of the Example 1, except that 25 g of lithium titanium oxide and 1 g of $TiO_2$ were used.

Comparative Example 1

An anode active material, an electrode and a lithium secondary battery were manufactured by the same method as those of the Example 1, except that only MGP was used instead of the core-shell type anode active material.

Comparative Example 2

An anode active material, an electrode and a lithium secondary battery were manufactured by the same method as those of the Example 1, except that a mixture of MGP and lithium titanium oxide with a weight ratio of 90:10 was used instead of the core-shell type anode active material.

Comparative Example 3

An anode active material, an electrode and a lithium secondary battery were manufactured by the same method as those of the Example 1, except that only 20 g of lithium titanium oxide was used as a material for a shell, and after coating, thermal treatment was performed at 450° C. for 4 hours with a temperature increase rate of 2° C./min under an oxygen atmosphere.

Characteristics Evaluation

1. Powder Characteristics

The average particle size, $D_{10}$, $D_{50}$ and $D_{90}$ before and after coating in anode active materials prepared according to the examples was measured by a laser diffraction technology while the anode active materials were dispersed using ultrasonic waves. A particle size analysis system (Malvern Instruments, Mastersizer 2000E) was used to measure the average particle size. According to measurement results of an anode active material of Example 1, an average particle size before coating is as follows: $D_{10}$=15.380 μm, $D_{50}$=23.519 μm, and $D_{90}$=36.396 μm, and an average particle size after coating is as follows: $D_{10}$=11.886 μm, $D_{50}$=24.705 μm, and $D_{90}$=43.705 μm.

And, 500 times of strokes were performed using 100 ml mass cylinder to measure a tap density, and changes in volume between before coating and after coating were measured.

The measurement results show that the average particle size and tap density hardly changed according to coating content, and the tap density was increased by 2 to 4% after coating.

2. Coating Characteristics

To check the surface characteristics of Example 1 and Comparative example 3, measurement results obtained using SEM (Scanning Electron Microscope) are shown in FIG. 1. And, mapping of the core-shell type carbon active material prepared in Example 1 is shown in FIG. 2. As shown in FIGS. 1 and 2, the carbonaceous material of the present invention is coated uniformly with lithium titanium oxide, $TiO_2$ and Super-P.

3. Electrochemical Characteristics

The batteries manufactured according to the examples and the comparative examples were initially charged using a charge/discharge cycle system on conditions of CC-CV (constant current-constant voltage) of a charge voltage of 4.2V and a current density of 400 mAh at 25° C., and after a resting stage of 10 minutes, were discharged with a discharge capacity of 1000 mAh until the voltage was 2.7V, and electrical characteristics and safety were evaluated.

(1) Initial charge/discharge efficiency, specific capacity and initial resistance(IR) are shown in Table 1.

TABLE 1

| Classi-fication | Coating material* | Coating content (weight ratio) | IR [mΩ] | 1st Efficiency (%) | Specific capacity (mAh/g) |
|---|---|---|---|---|---|
| Example 1 | L, C, T | 2.0/0.5/0.1 | 3.813 | 80.3 | 145.0 |
| Example 2 | L, C, T | 1.5/0.3/0.1 | 3.930 | 80.5 | 146.9 |
| Example 3 | L, T | 2.5/0.1 | 4.208 | 79.8 | 140.0 |
| Comparative example 1 | X | X | 2.920 | 82.5 | 150.9 |
| Comparative example 2 | X | 10(L), mixing | 5.435 | 78.3 | 133.3 |
| Comparative example 3 | L | 2.0, thermal treatment | 4.945 | 80.3 | 145.0 |

*L: $Li_4Ti_5O_{12}$, B: Super-P, T: $TiO_2$

As shown in Table 1, metal oxide was coated on the surface of the core, so that initial charge/discharge efficiency and specific capacity was relatively reduced.

(2) To evaluate an extent of improvement of conductivity, discharge characteristics and charge characteristics with current density were measured. The discharge characteristics with current density were measured by charging on conditions of CC-CV of a charge current of 2000 mAh and a charge voltage of 4.2V at 25° C., and after a resting stage of 10 minutes, discharging with a discharge current of 0.5 C to 20.0 C until the voltage was 2.7V.

As shown in Table 2, the discharge characteristics with current density were evaluated from a ratio of a discharge capacity at a current density of 20 C to a discharge capacity at a current density of 0.5 C(1000 mA) as a nominal capacity. The discharge characteristics with current density for Example 1 (FIG. 3a) and discharge characteristics with current density for Comparative example 1 (FIG. 3b) are shown in FIG. 3. At the same time, charge characteristics were measured by charging on conditions of CC-CV of a charge current of 0.5 C to 5.0 C and a charge voltage of 4.2V.

A charge capacity in a CC mode was compared with the total charge capacity according to current density, and comparison results are shown in Table 2 and FIG. 4.

And, cycle life for 1 C/1 C at room temperature using the prepared anode active material and resistance after 1000 cycles were measured, and evaluation results are shown in Table 2 and FIG. 5.

TABLE 2

| Classification | Coating material | 20 C discharge characteristics (@ 0.5 C, %) | 5.0 C charge characteristics | Cycle life (1000 cycles) (Relative capacity, %) | Specific capacity (mAh/g) |
| --- | --- | --- | --- | --- | --- |
| Example 1 | L, C, T | 96.6 | 81.5% | 98.6 | 3.943 |
| Example 2 | L, C, T | 91.5 | 81.4% | 94.4 | 4.015 |
| Example 3 | L, T | 81.6 | 78.8% | 88.8 | 4.895 |
| Comparative example 1 | X | 84.9 | 72.4% | 86.2 | 4.104 |
| Comparative example 2 | 10(L), mixing | 80.4 | 68.9% | 76.7 | 11.02 |
| Comparative example 3 | L | 96.6 | 78.6% | 93.9 | 6.102 |

As shown in Table 1 and FIGS. 3 and 4, as a coating content of lithium titanium oxide of high rate charge characteristics increases, initial charge/discharge efficiency and specific capacity was reduced. However, as shown in Table 2 and FIGS. 4 and 5, it is obvious that conductivity was improved from high rate discharge characteristics and charge characteristics.

And, the anode active material of Example 1 had better cycle life than the anode active materials of Comparative examples 1 and 3. The addition of $TiO_2$ to the lithium titanium oxide of the shell improved a coating performance, thereby suppressing a reaction between an anode active material and a liquid electrolyte and activating the surface of the anode active material due to coating of Super-P.

And, as shown in Tables 1 and 2, coating with only lithium titanium oxide (Comparative example 3) resulted in a larger resistance than coating with lithium titanium oxide and titan dioxide having a smaller average particle size than lithium titanium oxide (Example 3). And, as cycles are repeated, a resistance increase rate was increased.

(3) Tests for overcharge characteristics and high temperature storage characteristics and a nail penetration test were performed on the anode active material. The overcharge test was made with a current density of 2000 mA at 18V, 24V and 30V to measure the changes in shape and surface temperature of a battery after overcharge, and measurement results are shown in Table 3. The battery behavior and change in surface temperature of the anode active material of Example 1 during a 30V overcharge test are shown in FIG. 6.

The battery behavior during high temperature storage was measured, and measurement results of the examples and comparative examples are shown in Table 3. The battery behavior of the anode active material of Example 1 is shown in FIG. 7. The battery surface temperature after a nail penetration test was measured, and measurement results of the examples and comparative examples are shown in Table 3. The battery behavior and change in surface temperature of the anode active material of Example 1 are shown in FIG. 8.

TABLE 3

| Classification | Battery behavior, maximum battery surface temperature (° C.) | | | Hox box test | Nail penetration test |
| --- | --- | --- | --- | --- | --- |
| | 18 V | 24 V | 30 V | | |
| Example 1 | A, 58 | A, 68 | A, 72 | A, 2 h | A, 58 |
| Example 2 | A, 72 | A, 85 | B, 108 | B, 30 min | A, 63 |
| Example 3 | A, 57 | A, 69 | A, 76 | A, 1 h | A, 60 |
| Comparative example 1 | D, 270 | — | — | D, 0 min | D, 310 |
| Comparative example 2 | C, 180 | — | — | C, D | C, 200 |
| Comparative example 3 | A, 60 | A, 67 | A, 71 | A, 1 h | A, 59 |

A: no change,
B: smoke generation,
C: fire,
D: explosion

The above Tables 1 to 3 show that Examples 1 to 3 have a little lower initial charge/discharge efficiency and specific capacity than Comparative example 1. This is because the surface of MGP is coated with nano-sized lithium titanium oxide, consequently an irreversible capacity occurs at the other potential area, and as a result, Examples 1 to 3 exhibit a little lower specific capacity. However, this does not act as an important factor to battery characteristics. On the contrary, Comparative example 1 shows relatively higher initial charge/discharge efficiency and specific capacity, but shows very weak characteristics in the evaluation on electrical conductivity and safety.

However, the examples suppress a reaction with a liquid electrolyte and reduce resistance of the surface of an active material by an activated shell coating layer, and thus show a considerable improvement in high rate discharge characteristics and charge characteristics. In particular, it is found through Example 1 that addition of $TiO_2$ increases adhesion between a carbonaceous material and lithium titanium oxide and is effective to improve high rate characteristics.

Meanwhile, in the case of the anode active material of Comparative example 2 obtained by simply mixing a carbonaceous material and lithium titanium oxide, because the carbonaceous material and the lithium titanium oxide are operated at different voltage ranges, battery performance reduces and safety does not take effect. In the case of the anode active material of Comparative example 3, in which only lithium titanium oxide was used as a shell forming material, some of the lithium titanium oxide may not be involved in coating. Thus, the anode active material should contain a larger amount of liquid electrolyte to increase the surface resistance. As cycles are repeated with high rate charge/discharge, cycle life is reduced.

INDUSTRIAL APPLICABILITY

An anode active material for a lithium secondary battery according to the present invention comprises a carbonaceous material core, and a shell including spinel-type lithium titanium oxide particles and metal oxide that fills voids formed by the spinel-type lithium titanium oxide particles. A lithium secondary battery manufactured using the anode active material exhibits excellent electrical characteristics and safety. And, a method for preparing the anode active material for a lithium secondary battery according to the present invention provides excellent reproducibility and productivity in preparing the core-shell type anode active material of the present invention.

The invention claimed is:

1. An anode active material for a lithium secondary battery, comprising:
   a carbonaceous material core; and
   a shell formed outside of the carbonaceous material core, the shell comprising a plurality of spinel-type lithium titanium oxide particles, and a plurality of metal oxide particles, wherein the metal belongs to group 4 or 13 of the periodic table, the metal oxide particles filling voids formed by the carbonaceous material and the plurality of spinel-type lithium titanium oxide particles.

2. The anode active material for a lithium secondary battery according to claim 1,
   wherein the carbonaceous material forming the core is at least one selected from the group consisting of soft carbon, hard carbon, natural graphite, Kish graphite, pyrolytic carbon, mesophase pitch based carbon fiber, meso-carbon microbeads, mesophase pitches, and petroleum or coal tar pitch derived cokes.

3. The anode active material for a lithium secondary battery according to claim 1,
   wherein the spinel-type lithium titanium oxide has an average particle size of 30 to 800 nm.

4. The anode active material for a lithium secondary battery according to claim 1,
   wherein a weight ratio of the carbonaceous material core to the spinel-type lithium titanium oxide included in the shell is adjusted such that the carbonaceous material: the spinel-type lithium titanium oxide=1:0.0055~0.05.

5. The anode active material for a lithium secondary battery according to claim 1,
   wherein the metal oxide is titanium dioxide.

6. The anode active material for a lithium secondary battery according to claim 1,
   wherein an average particle size of the metal oxide is 5 to 30% of an average particle size of the spinel-type lithium titanium oxide.

7. The anode active material for a lithium secondary battery according to claim 1,
   wherein the metal oxide has a content of 2 to 10 parts by weight based on 100 parts by weight of the lithium titanium oxide.

8. The anode active material for a lithium secondary battery according to claim 1,
   wherein the shell further comprises, as a conductive material, at least one selected from the group consisting of carbon black, Ketjen black, graphite, acetylene black, carbon nano tube and activated carbon.

9. The anode active material for a lithium secondary battery according to claim 1,
   wherein the shell further comprises a polymer binder formed by melting thermoplastic polymer powder.

10. A method for preparing an anode active material for a lithium secondary battery, comprising:
    (S1) preparing a core forming carbonaceous material; and
    (S2) forming a shell outside of the core by dry-coating the core with a mixture of a plurality of spinel-type lithium titanium oxide particles and a plurality of metal oxide particles, wherein the metal belongs to group 4 or 13 of the periodic table, the metal oxide particles having such an average particle size to be located in voids formed by the carbonaceous material and the lithium titanium oxide particles.

11. The method for preparing an anode active material for a lithium secondary battery according to claim 10,
    wherein thermoplastic polymer powder is further included as a material for the shell in the step (S2).

12. The method for preparing an anode active material for a lithium secondary battery according to claim 10,
    wherein a conductive material is further included as a material for the shell in the step (S2), the conductive material being at least one selected from the group consisting of carbon black, Ketjen black, graphite, acetylene black, carbon nano tube and activated carbon.

13. An anode of a lithium secondary battery, comprising:
    an anode collector; and
    an anode active material layer including an anode active material, a binder and a conductive material, and formed on at least one surface of the anode collector,
    wherein the anode active material is defined in claim 1.

14. A lithium secondary battery, comprising:
    a cathode;
    an anode; and
    a separator interposed between the cathode and the anode,
    wherein the anode is defined in claim 13.

* * * * *